United States Patent
Sun et al.

(10) Patent No.: US 11,991,516 B2
(45) Date of Patent: May 21, 2024

(54) SESSION MIGRATION METHOD AND APPARATUS

(71) Applicant: HUAWEI TECHNOLOGIES CO., LTD., Shenzhen (CN)

(72) Inventors: Haiyang Sun, Beijing (CN); Anni Wei, Shenzhen (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 17/174,776

(22) Filed: Feb. 12, 2021

(65) Prior Publication Data
US 2021/0168596 A1 Jun. 3, 2021

Related U.S. Application Data

(63) Continuation of application No. PCT/CN2019/100462, filed on Aug. 13, 2019.

(30) Foreign Application Priority Data

Aug. 13, 2018 (CN) .......................... 201810918780.6

(51) Int. Cl.
*H04L 29/06* (2006.01)
*H04W 8/24* (2009.01)
(Continued)

(52) U.S. Cl.
CPC .......... *H04W 12/033* (2021.01); *H04W 8/24* (2013.01); *H04W 12/106* (2021.01); *H04W 12/72* (2021.01); *H04W 60/00* (2013.01)

(58) Field of Classification Search
None
See application file for complete search history.

(56) References Cited

U.S. PATENT DOCUMENTS 10,694,367 B1 * 6/2020 Sharma ................. H04L 67/535
10,791,508 B2 * 9/2020 Park ....................... H04W 48/18
(Continued)

FOREIGN PATENT DOCUMENTS

CN 107920350 A 4/2018
CN 108024296 A 5/2018
(Continued)

OTHER PUBLICATIONS

ETSI Technical Specification, "5G; System Architecture for the 5G System (3GPP TS 23.501 version 15.2.0 Release 15) System Architecture for the 5G System", 3GPP, Jun. 28, 2018, p. 1-220. (Year: 2018).*

(Continued)

*Primary Examiner* — Jeffery L Williams
(74) *Attorney, Agent, or Firm* — HAUPTMAN HAM, LLP

(57) ABSTRACT

A session migration method includes sending, by a transmission management apparatus, registration request cancellation information to a subscriber information management apparatus in response to user plane security enforcement information of a packet data unit (PDU) session failing to match user plane encryption protection information of an evolved packet system (EPS). The registration request cancellation information is useable to indicate that the PDU session fails to support migration to the EPS, and the PDU session has been registered with the subscriber information management apparatus.

17 Claims, 8 Drawing Sheets

(51) Int. Cl.
*H04W 12/033* (2021.01)
*H04W 12/106* (2021.01)
*H04W 12/72* (2021.01)
*H04W 60/00* (2009.01)

(56) References Cited

U.S. PATENT DOCUMENTS

| | | | |
|---|---|---|---|
| 11,463,929 B2* | 10/2022 | Kim | H04W 36/0022 |
| 2017/0289019 A1 | 10/2017 | Faccin et al. | |
| 2018/0192333 A1 | 7/2018 | Wu | |
| 2018/0376384 A1 | 12/2018 | Youn et al. | |
| 2019/0357129 A1* | 11/2019 | Park | H04W 60/04 |
| 2021/0084130 A1* | 3/2021 | Dai | H04L 63/20 |
| 2021/0168596 A1* | 6/2021 | Sun | H04W 12/033 |
| 2021/0258793 A1* | 8/2021 | Rohini | H04W 12/106 |
| 2021/0266410 A1* | 8/2021 | Lee | H04W 48/16 |
| 2022/0103664 A1* | 3/2022 | Dai | G06F 21/64 |

FOREIGN PATENT DOCUMENTS

| | | |
|---|---|---|
| EP | 3307010 A1 | 4/2018 |
| WO | 2018084635 A1 | 5/2018 |
| WO | 2018088812 A1 | 5/2018 |
| WO | 2018111029 A1 | 6/2018 |
| WO | 2018128529 A1 | 7/2018 |
| WO | 2018137824 A1 | 8/2018 |

OTHER PUBLICATIONS

European Office Action issued in corresponding European Application No. 19850055.5, dated Aug. 26, 2022, pp. 1-8.
Ravishankar Ravindran et al., Deploying ICN in 3GPP's 5G NextGen Core Architecture. 2018 IEEE 5G World Forum (5GWF), Jul. 9-11, 2018, 7 pages.
Ericsson et al.,"Corrections for handling UP security policy when interworking with EPC", 3GPP TSG-SA WG2 Meeting #127 S2-173175,Sanya, China, Apr. 16-20, 2018,total 3 pages.
Nokia et al., Architectural solution for User Plane (UP) Security policy and User Plane Integrity Protection. SA WG2 Meeting #S2-126, Feb. 26-Mar. 2, 2018, Montreal, Canada, S2-182990, 4 pages.
3GPP TS 23.401 V15.4.0 (Jun. 2018); 3rd Generation Partnership Project;Technical Specification Group Services and System Aspects;General Packet Radio Service (GPRS) enhancements for Evolved Universal Terrestrial Radio Access Network (E-UTRAN) access(Release 15), total 410 pages.
3GPP TS 23.501 V15.2.0 (Jun. 2018), 3rd Generation Partnership Project; Technical Specification Group Services and System Aspects; System Architecture for the 5G System;Stage 2(Release 15), total 216 pages.
3GPP TS 33.401 V15.4.0:3rd Generation Partnership Project; Technical Specification Group Services and System Aspects; 3GPP System Architecture Evolution (SAE); Security architecture(Release 15),Jun. 2018, total 162 pages.
Chinese Office Action issued in corresponding Chinese Application No. 201810918780.6, dated Aug. 26, 2020, pp. 1-7.
Extended European Search Report issued in corresponding European Application No. 19850055.5, dated Apr. 19, 2021, pp. 1-13.
International Search Report issued in corresponding International Application No. PCT/CN2019/100462, dated Oct. 30, 2019, pp. 1-9.

* cited by examiner

SESSION MIGRATION METHOD AND APPARATUS

CROSS-REFERENCE TO RELATED APPLICATIONS

This application is a continuation of International Application No. PCT/CN2019/100462, filed on Aug. 13, 2019, which claims priority to Chinese Patent Application No. 201810918780.6, filed on Aug. 13, 2018. The disclosures of the aforementioned applications are hereby incorporated by reference in their entireties.

TECHNICAL FIELD

The present invention relates to the communications field, and in particular, to a session migration method and apparatus.

BACKGROUND

In a 5th generation system (5GS), UE establishes a packet data unit (PDU) session in the 5GS to implement uplink and downlink transmission. To satisfy a smooth transition from an evolved packet system (EPS) to the 5GS and saving investment, the EPS and the 5GS may coexist in a quite long period of time in the future. Therefore, a requirement that the UE can move between the 5GS and the EPS is raised. Based on this requirement, the user equipment (UE) may migrate the PDU session established in the 5GS to the EPS, establish a PDN connection corresponding to the PDU session in the EPS, and then release the PDU session after the PDN connection is successfully established. However, user plane security capabilities of the 5GS and the EPS are different. The UE may migrate a PDU session that has a requirement beyond the user plane security capability of the EPS to the EPS. Consequently, the EPS cannot satisfy the user plane security capability requirement of the PDU session.

SUMMARY

According to embodiments of the present invention, a session migration method and apparatus are provided, to resolve a technical problem and avoid that a PDU session that has a requirement beyond a user plane security capability of an EPS is migrated to the EPS.

According to a first aspect, this application provides a session migration method, including. In a process in which a terminal apparatus moves from a 5GS to an EPS, when a user plane security status of a PDU session matches user plane encryption protection information of the EPS, the terminal apparatus sends PDN connection establishment request information to a mobility management apparatus, where the PDN connection establishment request information is used to establish a PDN connection corresponding to the PDU session in the EPS, and the PDU session is established by the terminal apparatus in the 5GS.

The mobility management apparatus is a network element responsible for mobility management in the EPS. For example, the mobility management apparatus is a mobility management entity (MME). When the terminal apparatus successfully establishes the PDU session in the EPS, the terminal apparatus initiates a PDU session release procedure.

Because the terminal apparatus cannot detect user plane security enforcement information of the PDU session, the terminal apparatus cannot parse content in the user plane security enforcement information of the PDU session. In this application, the terminal apparatus may determine the user plane security status of the PDU session by detecting a packet in the PDU session. For example if the terminal apparatus can directly parse (decrypt without using a key for parsing) content of the packet, it indicates that the packet is not encrypted, or if the terminal device needs to use a key to decrypt content of the packet, it indicates that the packet is encrypted. If the terminal apparatus detects that the packet carries a verification code used for integrity protection, it indicates that the packet is integrity protected; otherwise, it indicates that the packet is not integrity protected.

According to the foregoing description, when the terminal apparatus moves from the 5GS to the EPS, the terminal apparatus needs to establish the corresponding PDN connection in the EPS for the PDU session in the 5GS. Before establishing the PDN connection, the terminal apparatus needs to determine that the user plane security status of the PDU session matches the user plane encryption protection information of the EPS. This avoids that a PDU session that does not satisfy a user plane security requirement is migrated to the EPS, and reduces unnecessary signaling overheads.

In a possible design, the user plane security status of the PDU session includes an integrity protection status and an encryption status, and the user plane encryption protection information of the EPS includes user plane encryption activation information.

When the integrity protection status is that the PDU session is not integrity protected, and the encryption status is that the PDU session is not encrypted, the user plane security status of the PDU session matches the user plane encryption protection information of the EPS; or when the integrity protection status is that the PDU session is not integrity protected, the encryption status is that the PDU session is encrypted, and the user plane encryption activation information indicates that the EPS has activated user plane encryption, that is, a packet in the EPS is encrypted, the user plane security status of the PDU session matches the user plane encryption protection information of the EPS.

In a possible design, the user plane security status of the PDU session includes an integrity protection status.

When the integrity protection status is that the PDU session is integrity protected, the user plane security status of the PDU session does not match the user plane encryption protection information of the EPS.

If the PDU session has an integrity protection requirement, because a user plane of the EPS does not support integrity protection, a user plane security capability of the EPS does not satisfy the requirement of the PDU session. In other words, the user plane security status of the PDU session does not match the user plane encryption protection information of the EPS.

In a possible design, the method further includes:

When the user plane security status of the PDU session does not match the user plane encryption protection information of the EPS, the terminal apparatus determines not to send a PDN connection request to the mobility management apparatus. In other words, the terminal apparatus determines not to establish the PDN connection corresponding to the PDU session in the EPS. This avoids an unnecessary signaling resource waste caused by migrating a PDU session that has a requirement beyond the user plane security capability of the EPS to the EPS.

According to a second aspect, this application provides a session migration method, including: When user plane security enforcement information of a PDU session does not match user plane encryption protection information of an EPS, a transmission management apparatus sends registration request cancellation information to a subscriber information management apparatus, where the registration request cancellation information is used to indicate that the PDU session does not support migration to the EPS, and the PDU session has been registered with the subscriber information management apparatus.

The transmission management apparatus is configured to be responsible for a session capability function in the EPS, and also be responsible for a session management function in a 5GS. The transmission management apparatus may be an SMF+PGW-C in a scenario in which the EPS interworks with the 5GS. The subscriber information management apparatus is configured to store subscription data of a user. In an interworking architecture, the subscriber information management apparatus is a UDM+HSS.

According to the foregoing description, when the PDU session has been registered with the subscriber information management apparatus, and the transmission management apparatus determines that the user plane encryption enforcement information of the PDU session does not match the user plane encryption protection information of the EPS, the transmission management apparatus notifies the subscriber information management apparatus that the PDU session does not support the migration to the EPS. This avoids an unnecessary signaling resource waste caused by migrating a PDU session that has a requirement beyond a user plane security capability of the EPS to the EPS when a terminal apparatus moves from the 5GS to the EPS.

In a possible design, the user plane security enforcement information of the PDU session includes integrity protection requirement information.

When the integrity protection requirement information indicates that the PDU session is integrity protected, the user plane security enforcement information of the PDU session does not match the user plane encryption protection information of the EPS.

In a possible design, the user plane security enforcement information of the PDU session includes integrity protection requirement information and encryption requirement information, and the user plane encryption protection information of the EPS includes user plane encryption activation information.

When the integrity protection requirement information indicates that the PDU session is not integrity protected, and the encryption requirement information indicates that the PDU session is not encrypted, the user plane security enforcement information of the PDU session matches the user plane encryption protection information of the EPS; or when the integrity protection requirement information indicates that the PDU session is not integrity protected, the encryption requirement information indicates that the PDU session is encrypted, and the user plane encryption capability information indicates that the EPS has activated user plane encryption, the user plane security enforcement information of the PDU session matches the user plane encryption protection information of the EPS.

In a possible design, the method further includes:

When the user plane security enforcement information of the PDU session matches the user plane encryption protection information of the EPS, the transmission management apparatus determines not to send a registration request cancellation to the subscriber information management apparatus.

In a possible design, the registration request cancellation information is used to delete the PDU session or set EPS migration indication information that is of the PDU session and that is stored in the subscriber information management apparatus to a preset value, and the preset value indicates that the migration to the EPS is not supported.

According to a third aspect, this application provides a session migration method, including:

A subscriber information management apparatus receives a PDU session identifier from a transmission management apparatus. When user plane security enforcement information associated with the PDU session identifier matches user plane encryption protection information of an EPS, the subscriber information management apparatus sends first response information to the transmission management apparatus, where the first response information indicates that a PDU session indicated by the PDU session identifier supports migration to the EPS. The user plane security enforcement information associated with the PDU session identifier indicates that a network element apparatus (for example, the subscriber information management apparatus) stores a PDU session identifier and user plane security enforcement information, and there is a mapping relationship between the PDU session identifier and the user plane security enforcement information.

The subscriber information management apparatus is configured to manage subscriber information in a 5GS and the EPS. The subscriber information management apparatus may be a UDM+HSS, that is, a network element obtained by integrating a UDM with an HSS. A transmission management network element is configured to manage sessions in the 5GS and the EPS. The transmission management network element may be an SMF+PGW-C, that is, a network element obtained by integrating an SMF with a PGW-C.

The subscriber information management apparatus may carry the PDU session identifier in registration request information, and the registration request information is used to register the PDU session indicated by the PDU session identifier with the subscriber information management apparatus.

According to the foregoing description, when determining that the user plane security enforcement information of the PDU session matches the user plane encryption protection information of the EPS, the subscriber information management apparatus notifies the transmission management network element that the PDU session supports the migration to the EPS. This avoids that the transmission management network element migrates, in a subsequent procedure of performing PDU session migration, a PDU session that has a requirement beyond a user plane security capability of the EPS to the EPS, and reduces an unnecessary signaling resource waste.

In a possible design, the user plane security enforcement information associated with the PDU session identifier includes integrity protection requirement information and encryption requirement information, and the user plane encryption protection information of the EPS includes user plane encryption activation information.

When the integrity protection requirement information indicates that the PDU session is not integrity protected, and the encryption requirement information indicates that the PDU session is not encrypted, the user plane security enforcement information associated with the PDU session identifier matches the user plane encryption protection information of the EPS; or when the integrity protection requirement information indicates that the PDU session is not integrity protected, the encryption requirement information indicates that the PDU session is encrypted, and the user plane encryption activation information indicates that the EPS has activated user plane encryption, the user plane security enforcement information associated with the PDU session identifier matches the user plane encryption protection information of the EPS.

In a possible design, the user plane security enforcement information associated with the PDU session identifier includes integrity protection requirement information.

When the integrity protection requirement information indicates that the PDU session is integrity protected, the user plane security enforcement information associated with the PDU session identifier does not match the user plane encryption protection information of the EPS.

In a possible design, the method further includes:

When the user plane security enforcement information associated with the PDU session identifier does not match the user plane encryption protection information of the EPS, the subscriber information management apparatus sends second response information to the transmission management apparatus, where the second response information indicates that the PDU session does not support the migration to the EPS.

In a possible design, the method further includes: The subscriber information management apparatus receives the PDU session identifier and the user plane security enforcement information associated with the PDU session identifier that are from the transmission management apparatus.

A fourth aspect of this application discloses an information reporting method, including: A session management function (SMF) sends EPS migration support indication information to a policy charging function (PCF). The EPS migration indication information indicates whether a PDU session supports migration to an EPS. The PDU session is established in a 5GS. When the EPS migration indication information indicates that the PDU session supports the migration to the EPS, the PCF obtains encryption requirement information in user plane security enforcement information of the PDU session, and when the encryption requirement information indicates that the PDU session is preferentially encrypted, the PCF changes the encryption requirement information to indicate not to encrypt the PDU session. For example, when the encryption requirement information indicates "preferred", the PCF changes the encryption requirement information to indicate "not needed".

Alternatively, an SMF obtains EPS migration indication information. When the EPS migration indication information indicates that a PDU session supports migration to an EPS, the SMF obtains encryption requirement information in user plane security enforcement information of the PDU session, and when the encryption requirement information indicates that the PDU session is preferentially encrypted, the SMF changes the encryption requirement information to indicate not to encrypt the PDU session. For example, when the encryption requirement information indicates "preferred", the SMF changes the encryption requirement information to indicate "not needed".

Another aspect of this application provides a session migration apparatus. The apparatus is configured to implement a function of a behavior of the terminal apparatus in the possible designs in the first aspect. The function may be implemented by hardware, or may be implemented by hardware executing corresponding software. The hardware or the software includes one or more modules corresponding to the foregoing function.

In a possible design, a structure of the terminal apparatus includes a processor and a transceiver. The processor is configured to: in a process in which the terminal apparatus moves from a 5GS to an EPS, determine whether user plane security status of a PDU session matches user plane encryption protection information of the EPS. The transceiver is configured to: when a determining result of the processor is yes, send PDN connection establishment request information to a mobility management apparatus, where the PDN connection establishment request information is used to establish a PDN connection corresponding to the PDU session in the EPS, and the PDU session is established by the terminal apparatus in the 5GS. The terminal apparatus may further include a memory, where the memory is configured to be coupled to the processor and stores a program instruction and data that are necessary for a network device.

Another aspect of this application provides a session migration apparatus. The apparatus has a function to implement a behavior of the transmission management apparatus in the possible designs in the second aspect. The function may be implemented by hardware, or may be implemented by hardware executing corresponding software. The hardware or the software includes one or more modules corresponding to the foregoing function. The module may be software and/or hardware.

In a possible design, a structure of the transmission management apparatus includes a transceiver and a processor. The processor is configured to determine whether user plane security enforcement information of a PDU session matches user plane encryption protection information of an EPS. The transceiver is configured to: when a determining result of the processor is no, send registration request cancellation information to a subscriber information management apparatus, where the registration request cancellation information is used to indicate that the PDU session does not support migration to the EPS, and the PDU session has been registered with the subscriber information management apparatus.

Another aspect of this application provides a session migration apparatus. The apparatus has a function to implement a behavior of the subscriber information management apparatus in the possible designs in the third aspect. The function may be implemented by hardware, or may be implemented by hardware executing corresponding software. The hardware or the software includes one or more modules corresponding to the foregoing function. The module may be software and/or hardware.

In a possible design, a structure of the subscriber information management apparatus includes a transceiver and a processor. The transceiver is configured to support in receiving a PDU session identifier from a transmission management apparatus. The processor determines whether user plane security enforcement information associated with the PDU session identifier matches user plane encryption protection information of an EPS. The transceiver is further configured to: when a determining result of the processor is yes, send first response information to the transmission management apparatus, where the first response information indicates that a PDU session indicated by the PDU session identifier supports migration to the EPS.

Another aspect of this application provides a computer storage medium, including an instruction. When the instruction is run on a computer, the computer is enabled to perform the method according to any one of the first aspect and the possible implementations of the first aspect.

Another aspect of this application provides a computer program product including an instruction. When the computer program product runs on a computer, the computer is enabled to perform the method according to any one of the first aspect and the possible implementations of the first aspect.

Another aspect of this application provides a computer storage medium, including an instruction. When the instruction is run on a computer, the computer is enabled to perform the method according to any one of the second aspect and the possible implementations of the second aspect.

Another aspect of this application provides a computer program product including an instruction. When the computer program product runs on a computer, the computer is enabled to perform the method according to any one of the second aspect and the possible implementations of the second aspect.

Another aspect of this application provides a computer storage medium, including an instruction. When the instruction is run on a computer, the computer is enabled to perform the method according to any one of the third aspect and the possible implementations of the third aspect.

Another aspect of this application provides a computer program product including an instruction. When the computer program product runs on a computer, the computer is enabled to perform the method according to any one of the third aspect and the possible implementations of the third aspect.

BRIEF DESCRIPTION OF DRAWINGS

FIG. 2 is a schematic flowchart of session migration according to an embodiment of the present invention;

DESCRIPTION OF EMBODIMENTS

Figure 1A:
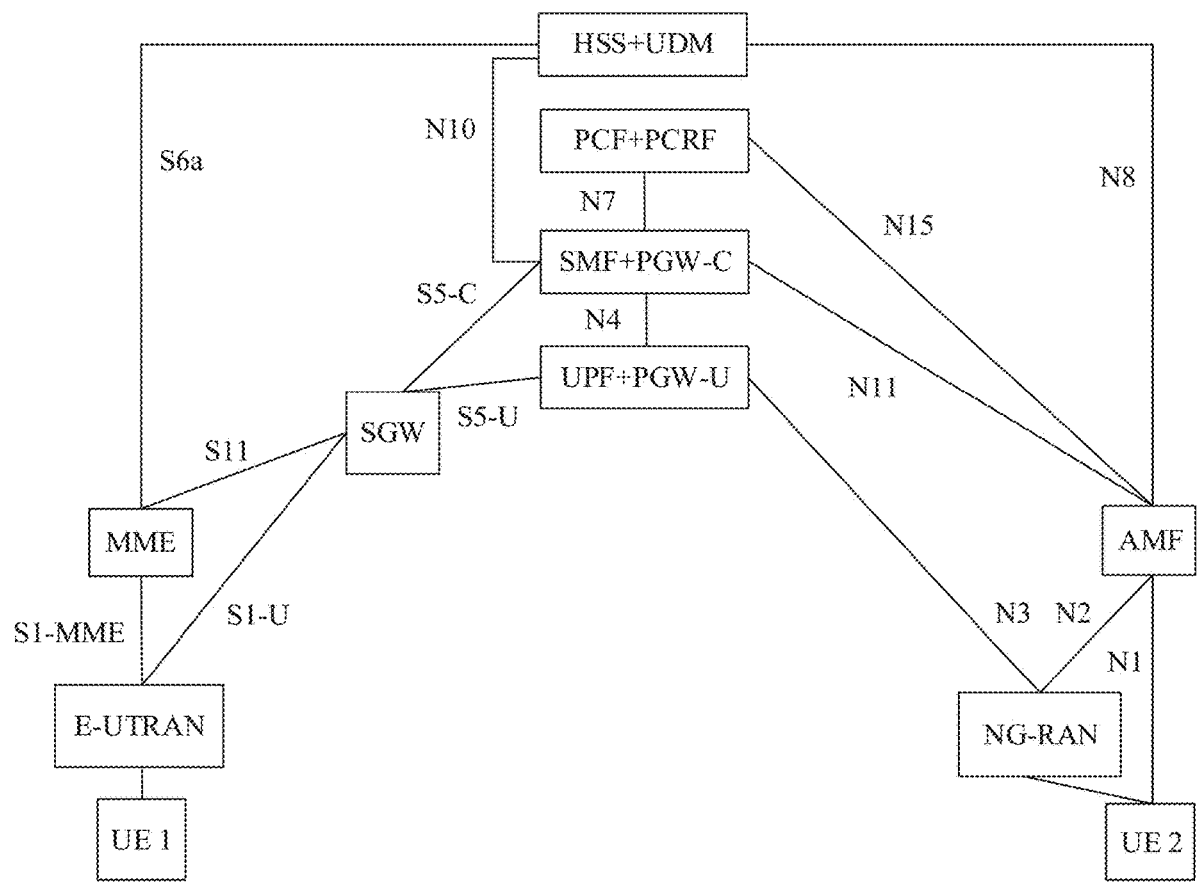
FIG. 1A is a schematic structural diagram of a communications system according to an embodiment of the present invention.

FIG. 1A is an architectural diagram of a communications system in a non-roaming scenario based on interworking between a 5GS and an EPS (Non-roaming architecture for interworking between 5GS and EPC/E-UTRAN) according to an embodiment of the present invention. The communications system in FIG. 1A includes a unified data management+home subscriber server (UDM+HSS), a policy and charging function+policy and charging rules function (PCF+PCRF), a session management function+PDN gateway for control plane (SMF+PGW-C), a user plane function+PDN gateway for user plane (UPF+PGW-U), a serving gateway (SGW), a mobility management entity (MME), an evolved universal terrestrial radio access network (E-UTRAN), user equipment (UE) 1, an access and mobility management function (AMF), a next generation radio access network (NG-RAN), and UE 2. The UDM+HSS is a network element obtained by integrating the HSS in the EPS with the UDM in the 5GS, the PCF+PCRF is a network element obtained by integrating the PCRF in the EPS with the PCF in the 5GS, the SMF+PGW-C is a network element obtained by integrating the PGW-C in the EPS with the SMF in the 5GS, and the UPF+PGW-U is a network element obtained by integrating the PGW-U in the EPS with the UPF in the 5GS. The MME and the E-UTRAN are network elements in the EPS, and the AMF and the NG-RAN are network elements in the 5GS. The UE 1 accesses a core network through the E-UTRAN, and the UE 2 accesses the core network through the NG-RAN. The UE 1 and the UE 2 may represent same UE.

The following describes interfaces in the communications system in FIG. 1A.

An interface S6a is a communications interface between the MME and the HSS+UDM. An interface S11 is a communications interface between the MME and the SGW. An interface S1-MME is a communications interface between the MME and the E-UTRAN. An interface S1-U is a communications interface between the E-UTRAN and the SGW. An interface N10 is a communications interface between the HSS+UDM and the SMF+PGW-C. An interface S5-C is a communications interface of a control plane between the SGW and the SMF+PGW-C. An interface S5-U is a communications interface of a user plane between the SGW and the UPF+PGW-U. An interface N7 is a communications interface between the PCF+PCRF and the SMF+PGW-C. N4 is a communications interface between the SMF+PGW-C and the UPF+PGW-U. An interface N8 is a communications interface between the HSS+UDM and the AMF. An interface N15 is a communications interface between the PCF+PCRF and the AMF. An interface N1 is a communications interface between the SMF+PGW-C and the AMF. An interface N3 is a communications interface between the UPF+PGW-U and the NG-RAN. An interface N2 is a communications interface between the NG-RAN and the AMF. An interface N1 is a communications interface between the AMF and the UE.

Figure 1B:
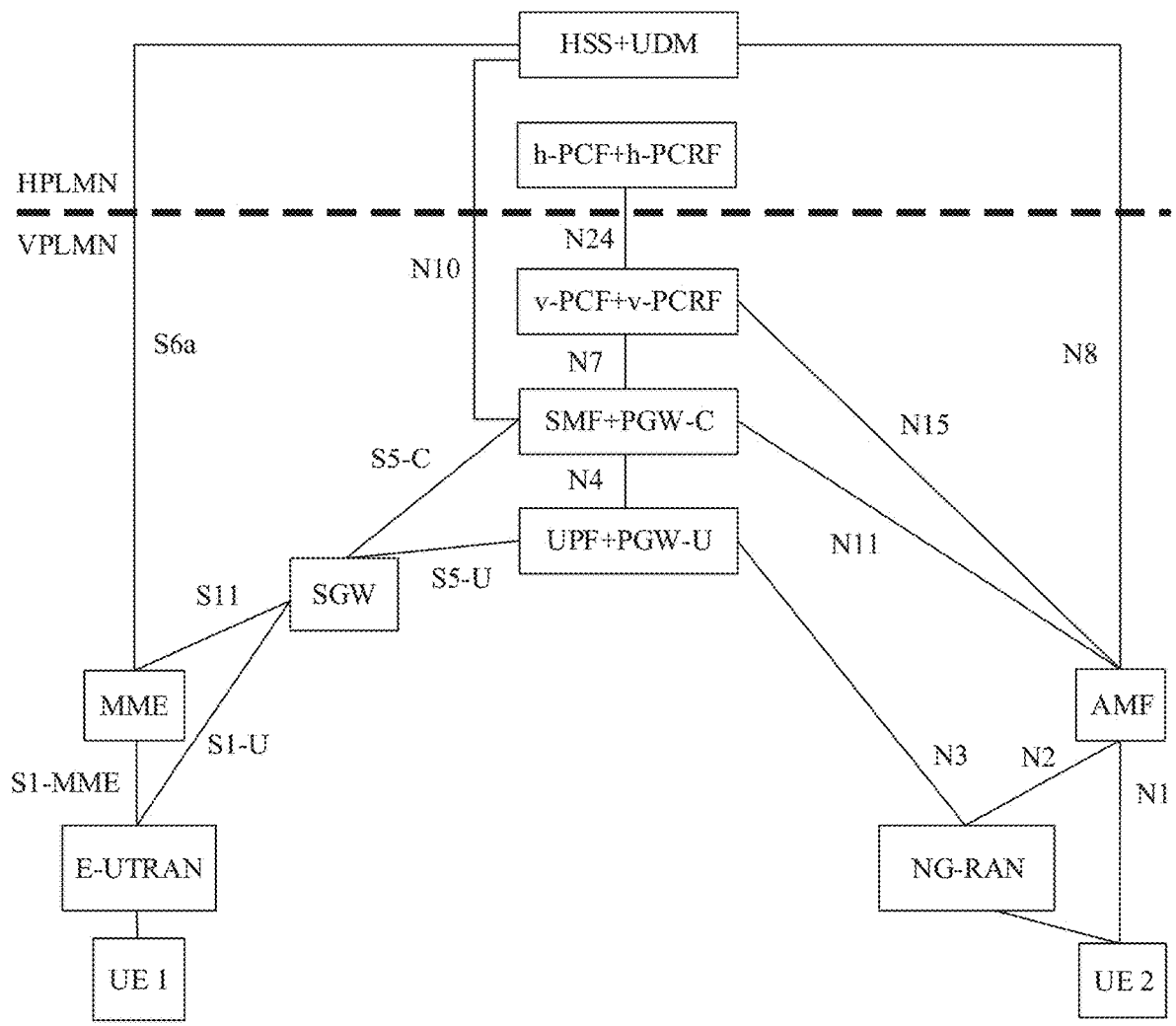
FIG. 1B is another schematic structural diagram of a communications system according to an embodiment of the present invention.

FIG. 1B is an architectural diagram of a communications system in a local breakout roaming scenario based on interworking between a 5GS and an EPS (Local breakout roaming architecture for interworking between 5GS and EPC/E-UTRAN) according to an embodiment of the present invention. The communications system in FIG. 1B includes a UDM+HSS, a home policy and charging function+home policy and charging rules function (h-PCF+h-PCRF), a visited policy and charging function+visited policy and charging rules function (v-PCF+v-PCRF), an SMF+PGW-C, a UPF+PGW-U, an SGW, an MME, an E-UTRAN, UE 1, an AMF, an NG-RAN, and UE 2. The UDM+HSS is a network element obtained by integrating the HSS in the EPS with the UDM in the 5GS, the h-PCF+h-PCRF and the v-PCF+v-PCRF are network elements obtained by integrating the PCRF in the EPS with the PCF in the 5GS, the SMF+PGW-C is a network element obtained by integrating the PGW-C in the EPS with the SMF in the 5GS, and the UPF+PGW-U is a network element obtained by integrating the PGW-U in the EPS with the UPF in the 5GS. The MME and the E-UTRAN are network elements in the EPS, and the AMF and the NG-RAN are network elements in the 5GS. The UE 1 camps on the E-UTRAN, and the UE 2 camps on the NG-RAN. The HSS+UDM is located in a home public land mobile network (HPLMN), and other network elements in the communications system are located in a visited public land mobile network VPLMN (VPLMN).

The following describes interfaces in the communications system in FIG. 1B.

An interface S6a is a communications interface between the MME and the HSS+UDM. An interface S11 is a communications interface between the MME and the SGW. An interface S1-MME is a communications interface between the MME and the E-UTRAN. An interface S1-U is a communications interface between the E-UTRAN and the SGW. An interface N10 is a communications interface between the HSS+UDM and the SMF+PGW-C. An interface S5-C is a communications interface of a control plane between the SGW and the SMF+PGW-C. An interface S5-U is a communications interface of a user plane between the SGW and the UPF+PGW-U. An interface N24 is a communications interface between the h-PCF+h-PCRF and the v-PCF+v-PCRF, and an interface N7 is a communications interface between the v-PCF+v-PCRF and the SMF+PGW-C. An interface N4 is a communications interface between the SMF+PGW-C and the UPF+PGW-U. An interface N8 is a communications interface between the HSS+UDM and the AMF. An interface N15 is a communications interface between the v-PCF+v-PCRF and the AMF. An interface N11 is a communications interface between the SMF+PGW-C and the AMF. An interface N3 is a communications interface between the UPF+PGW-U and the NG-RAN. An interface N2 is a communications interface between the NG-RAN and the AMF. An interface N1 is a communications interface between the AMF and the UE.

The following describes functions of the network elements in FIG. 1A and FIG. 1B.

The UPF+PGW-U is used for user data transmission management. In an interworking architecture of the EPS and the 5GS, the network element can not only be used for EPS data transmission, but also provide a 5G data transmission function.

The SMF+PGW-C is used for session establishment, deletion, and modification management. In the interworking architecture, the network element can provide both an EPS session management function and a 5G session management function.

The PCF+PCRF is used as a policy and charging control entity. In the interworking architecture, the network element can provide a terminal apparatus with both EPS policy and charging control and 5G policy and charging control.

The HSS+UDM is configured to store subscription data of a user. In the interworking architecture, the network element stores both EPS subscription information and 5G subscription information of the terminal apparatus.

The 5G radio access network (RAN) provides a radio air interface to access a core network for a terminal apparatus, to obtain a corresponding service.

The evolved universal terrestrial radio access network (E-UTRAN) is used for managing radio resources, establishing, modifying, or deleting an air interface resource for the terminal apparatus, providing data and signaling transmission for the terminal apparatus, and the like.

The AMF is used for access and mobility management of a user, mainly including registration management, accessibility management, mobility management, paging management, access authentication and authorization, encryption and integrity protection on non-access stratum signaling, and the like of the user.

The MME is used for mobility management of a user. For example, the mobility management of the user mainly includes attach management, accessibility management, mobility management, paging management, access authentication and authorization, encryption and integrity protection on non-access stratum signaling, and the like of the user.

The SGW is a user plane gateway, and is a termination point on a user plane of the E-UTRAN. Serving as a local mobility anchor for a handover between base stations, the SGW manages data packet routing and transmission, adds a packet tag of a transport layer, and the like.

The UE in this application is a device with a wireless communication function, may be deployed on the land, and includes an indoor device, an outdoor device, a handheld device, a wearable device, or a vehicle-mounted device; may be deployed on the water (for example, in a steamship); or may be deployed in the air (for example, on an airplane, on a balloon, or on a satellite). The terminal apparatus may be a mobile phone, a tablet (Pad), a computer with a wireless transceiver function, a virtual reality (VR) terminal apparatus, an augmented reality (AR) terminal apparatus, a wireless terminal in industrial control, a wireless terminal in unmanned driving (self driving), a wireless terminal in telemedicine (remote medical), a wireless terminal in a smart grid, a wireless terminal in transportation safety, a wireless terminal in a smart city, a wireless terminal in a smart home, or the like. Alternatively, the terminal apparatus may be a handheld device that has a wireless communication function, a vehicle-mounted device, a wearable device, a computing device, another processing device connected to a wireless modem, or the like. The terminal apparatus may have different names in different networks, for example, a terminal apparatus, an access terminal, a subscriber unit, a subscriber station, a mobile station, a mobile console, a remote station, a remote terminal, a mobile device, a user terminal, a terminal, radio communications equipment, a user agent or a user apparatus, a cellular phone, a cordless phone, a session initiation protocol (SIP) phone, a wireless local loop (WLL) station, a personal digital assistant (PDA), or a terminal apparatus in a 5G network or a future evolved network.

Figures 1, 1C:
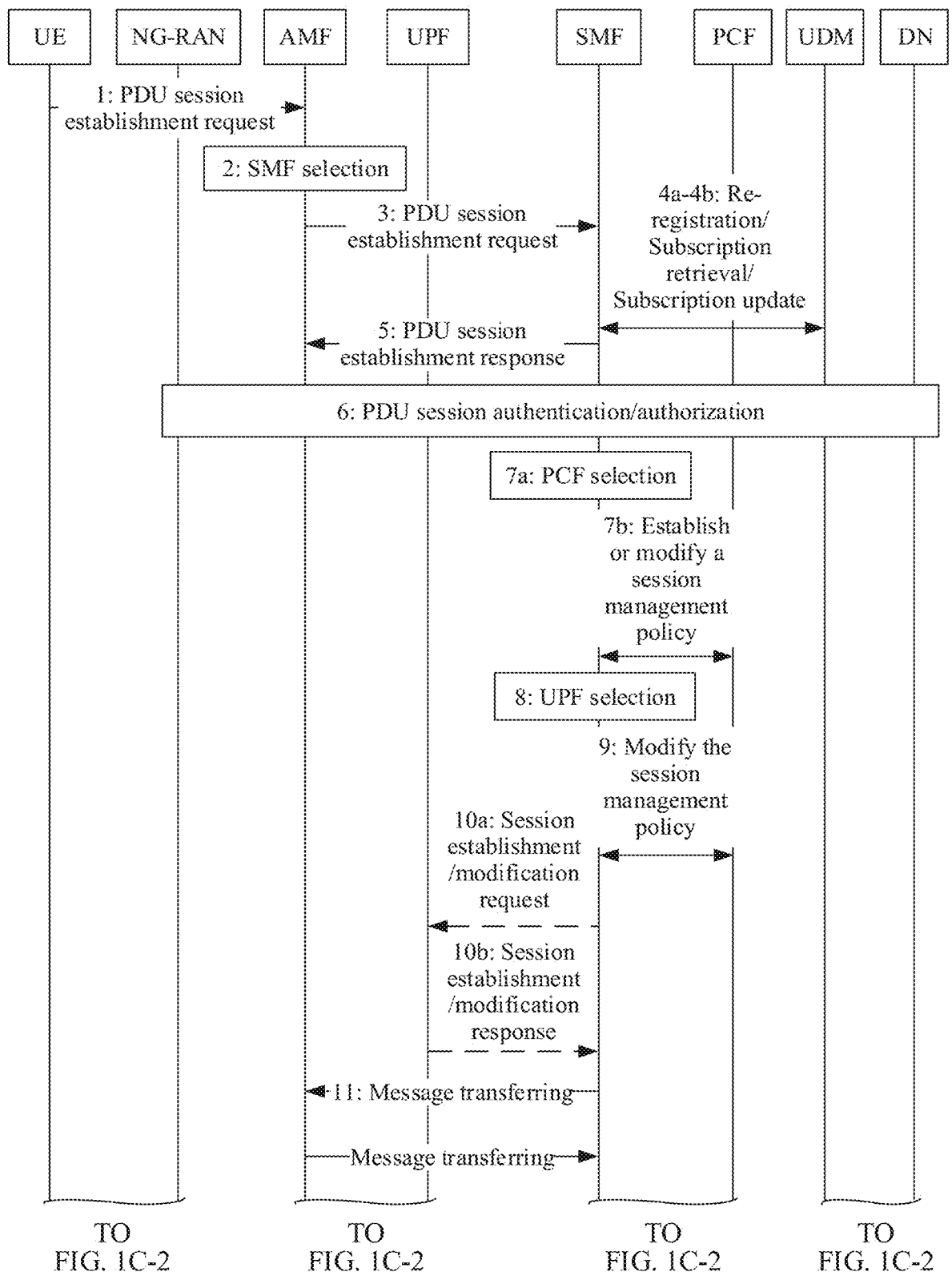
FIG. 1C-1 and FIG. 1C-2 are a schematic diagram of a PDU session establishment procedure according to an embodiment of the present invention.
Figures 1, 1C, 2:
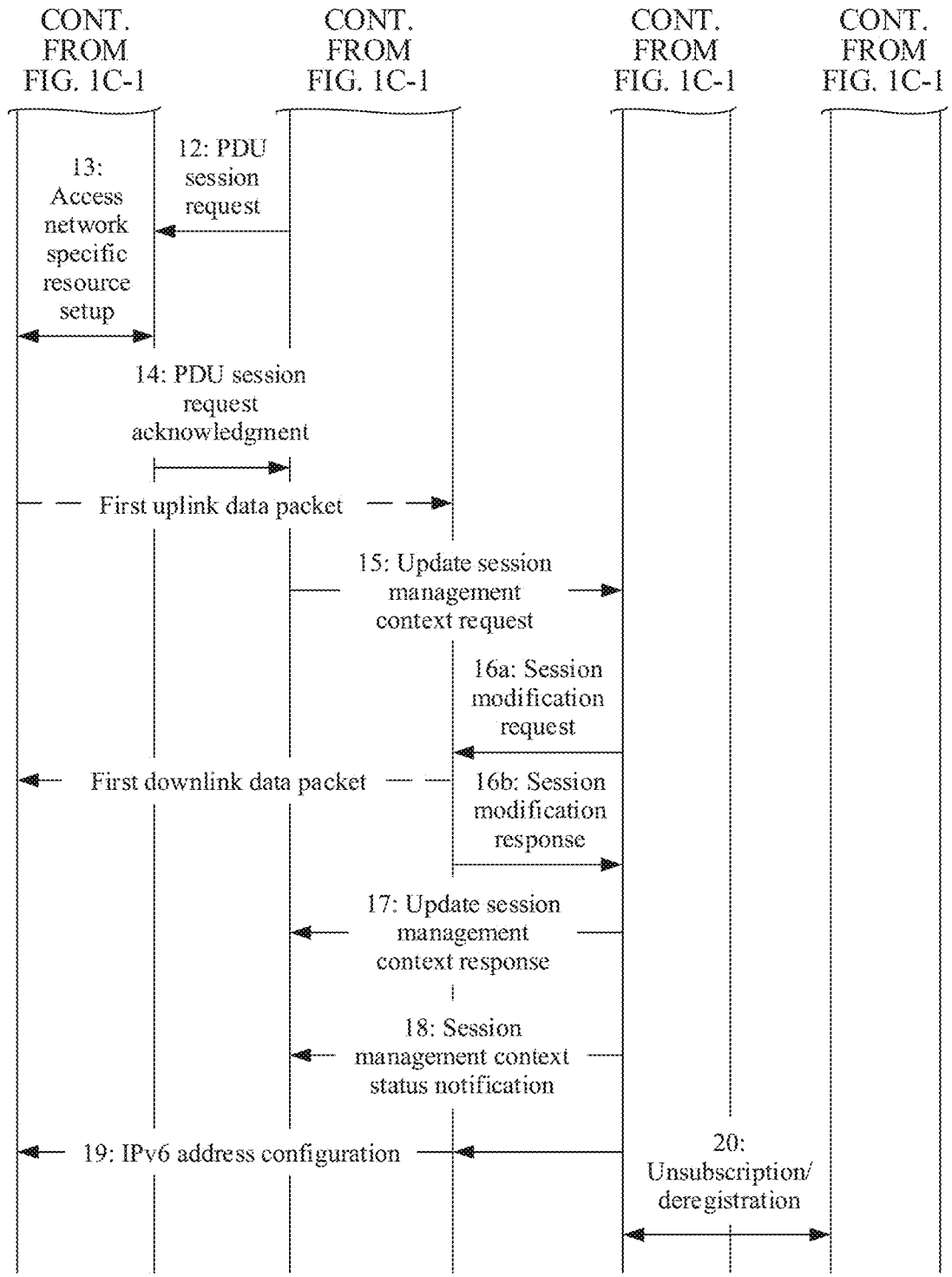

FIG. 1C-1 and FIG. 1C-2 are a schematic diagram of a PDU session establishment procedure in a 5GS according to an embodiment of the present invention. The procedure includes the following steps:

1: UE sends a PDU session establishment request to an AMF, and the AMF receives the PDU session establishment request from the UE, where the PDU session establishment request is used to establish a PDU session in the 5GS.

2: The AMF selects an SMF.

3a: The AMF sends the PDU session establishment request to the SMF, and the SMF receives the PDU session establishment request from the AMF, where the SMF may send the PDU session establishment request to the AMF through an interface Nsmf.

4a and 4b: The SMF registers with a UDM, and obtains subscription information from the UDM, where the subscription information includes a user plane security policy.

5: The SMF sends a PDU session establishment response to the AMF, and the AMF receives the PDU session establishment response from the SMF, where the SMF may reject to establish the PDU session in this step, and carry a rejection cause value in the PDU session establishment response.

6: Authentication/authorization of the PDU session.

7a and 7b: The SMF selects a PCF, and the SMF requests for a policy rule from the PCF, where the SMF may obtain a dynamic user plane security policy of the PDU session from the PCF to update the user plane security policy in the subscription information.

8: The SMF selects a UPF.

9: The SMF sends information related to the PDU session (for example, an IP address/prefix of the UE, and a trigger status) to the PCF, and the PCF receives the information that is related to the PDU session and that is reported by the SMF.

10a and 10b: The SMF sends tunnel information and rule information to the UPF, and the UPF receives the tunnel information and the rule information that are from the SMF.

11: The SMF sends a PDU session identifier, session management information (SM information) and a session management container (SM container) that are associated with the PDU session identifier to the AMF.

12: The AMF sends a PDU session request to an NG-RAN, and the RAN receives the PDU session request from the AMF, where the PDU session request includes the SM information and a NAS message, the AMF sends the SM information to the RAN through an interface N2, and sends the NAS message including the SM container to the RAN. In other words, the AMF sends the SM container to the RAN in a transparent transmission manner. The SM information protects user plane policy enforcement of the PDU session.

13: Perform an access network specific resource setup (AN specific resource setup) between the NG-RAN and the UE, and in this process, the NR-RAN sends a PDU session establishment accept to the UE.

14: The NG-RAN sends a PDU session request acknowledgment (ACK) to the AMF, and the AMF accepts the PDU session request acknowledgment from the NG-RAN.

15: The AMF sends an update session management context request to the SMF, and the SMF accepts the update session management context request from the AMF, where the request may be sent through the interface Nsmf.

16a: The SMF sends a session modification request to the UPF, and the UPF receives the session modification request from the SMF, where the request may be sent through an interface N4.

16b: The UPF sends a session modification response to the SMF, and the SMF receives the session modification response from the SMF, where the response may be sent through the interface N4.

17: The SMF sends an update session management context response to the AMF, and the AMF receives the update session management context response from the SMF.

18: The SMF sends a session management context status notification (PDU session SM context status notify) to the AMF, and the AMF receives the session management context status notification from the SMF.

19: The SMF configures IPv6 addresses for the UPF and the UE.

20: Perform an unsubscription/deregistration procedure between the SMF and the UDM.

Figure 1D:
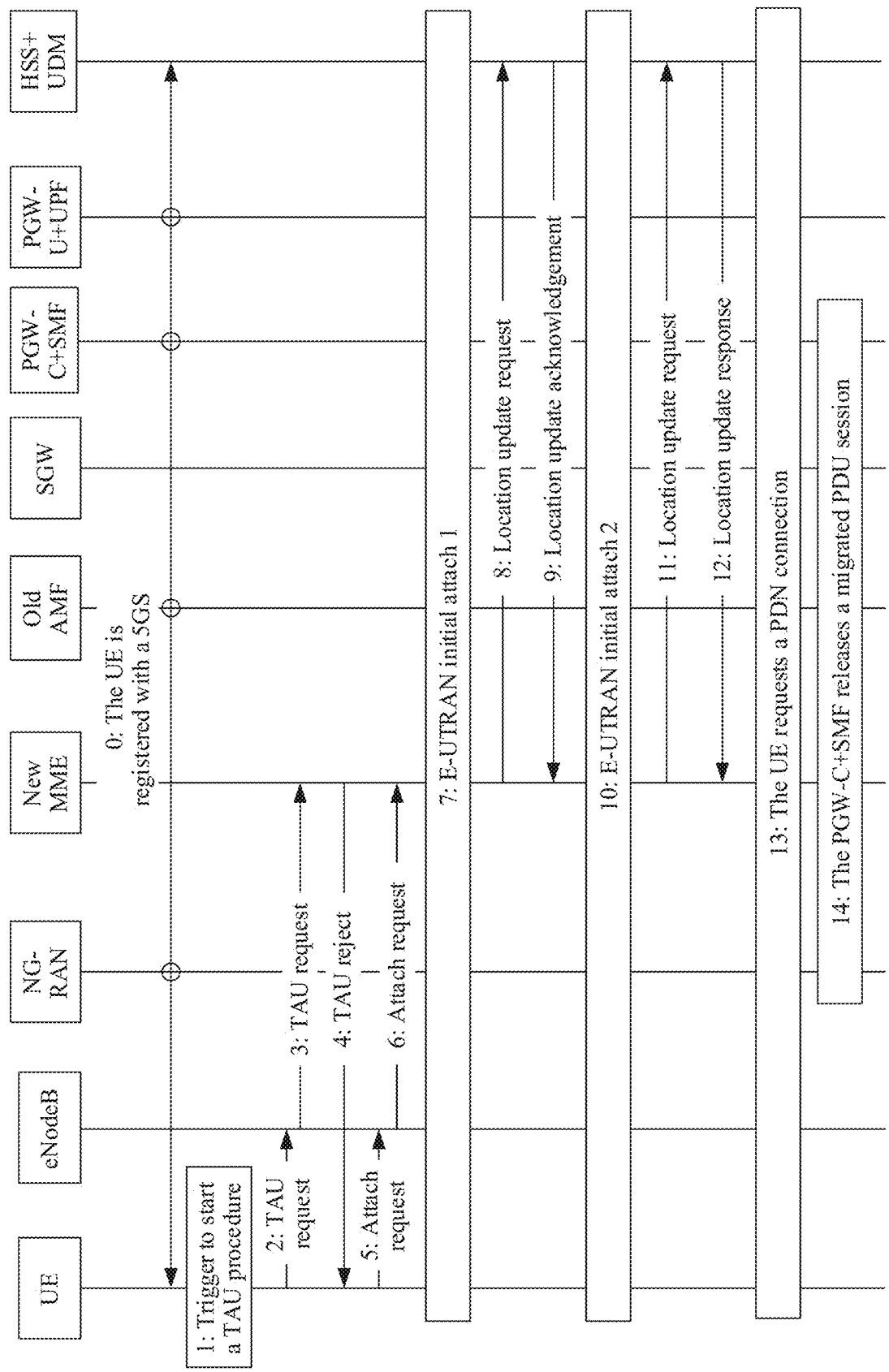
FIG. 1D is a schematic diagram of a mobility procedure in which UE moves from a 5GS to an EPS according to an embodiment of the present invention.
Figure 2:
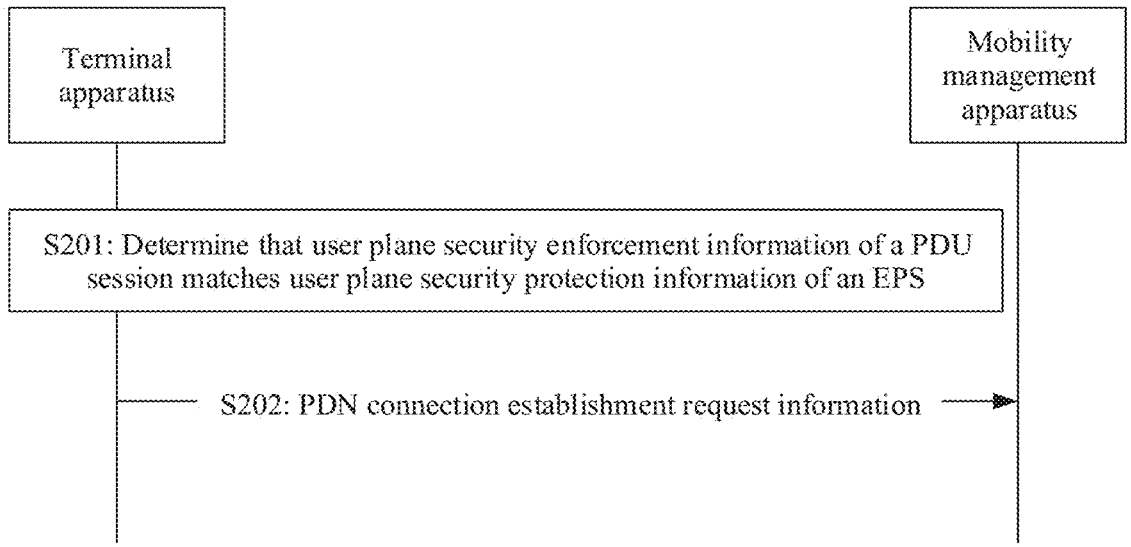

FIG. 1D is a schematic diagram of a mobility procedure of moving from a 5GS to an EPS according to an embodiment of the present invention. The procedure includes the following steps:

0: UE is registered with the 5GS, and the UE establishes a PDU session in the 5GS.

1: The UE triggers a tracking area update (TAU) procedure. When the UE moves from an NR-RAN in the 5GS to an E-UTRAN in the EPS, the UE detects that the UE enters a new tracking area, and the tracking area is not in a tracking area list maintained by the UE; or when the UE performs periodic tracking area update, the UE detects that the UE enters a new tracking area.

2: The UE sends a TAU request to an eNodeB, and the eNodeB receives the TAU request from the UE, where the TAU request is used to request for tracking area update, the TAU request carries an evolved packet system globally unique temporary UE identity (EPS globally unique temporary UE identity, EPS-GUTI) mapped from a 5G-GUTI 5th generation system globally unique temporary UE identity (5G-GUTI). The evolved packet system globally unique temporary UE identity indicates that the UE moves from the 5GS, and the eNodeB is a node in the E-UTRAN.

3: The eNodeB sends the TAU request to a new MME, and the new MME receives the TAU request from the eNodeB, where the new MME is a network element in the EPS, and the eNodeB generates an MME address based on the EPS-GUTI and sends the TAU request to the MME.

4: The new MME sends a TAU reject to the UE, and the UE receives the TAU reject from the new MME. If the MME detects, based on a GUTI that is of the UE and that is mapped from the 5G-GUTI, that a node serving the UE is an AMF, and the MME supports an interworking procedure between the 5GS and the EPS without an interface N26, the MME sends the TAU reject to the UE.

5 to 12: The UE initiates an attach procedure (E-UTRAN initial attach) in the EPS, where the attach procedure initiated by the UE in the EPS is similar to an attach procedure in an interworking scenario, so that details are not described herein again. In step 9, an HSS+UDM sends subscription information to the new MME.

13: The UE requests for a PDN connection procedure. If the PDU session of the UE in the 5GS is migrated to the EPS and a same IP address or prefix is retained, the UE performs a PDN connection establishment procedure and sets a request type to "handover". The UE needs to provide an APN and a PDU session identifier (corresponding to the PDU session migrated by the UE to the EPS), and the UE may provide the PDU session identifier in a protocol configuration option (PCO).

In a single-registration mode, the UE may perform this step immediately after the attach. In a dual-registration mode, the UE may perform this step at any time after the attach, and may perform this step only for some PDU sessions in the 5GS. The MME determines a PGW-C+SMF address based on the APN sent by the UE and the subscription information obtained from the HSS+UDM. The PGW-C+SMF uses the PDU session identifier to associate a PDN connection with the PDU session in the 5GS. After this procedure, a PGW-U+UPF starts to route a downlink data packet of the established PDN connection to an SGW 14: The PGW-C+SMF releases the migrated PDU session in the 5GS, to release a resource of the PDU session.

It can be learned from the mobility procedure of moving from the 5GS to the EPS in FIG. 1D that when there is no interface N26 between the AMF and the MME, a same DNN and S-NSSAI correspond to a plurality of PDU sessions, and only one PDU session can be selected for each APN. The UE selects one PDU session in a random manner, and migrates the PDU session to the EPS. In this process, the UE may select a PDU session that has a requirement beyond a user plane security capability of the EPS and migrate the PDU session to the EPS, and establish a PDN connection corresponding to the PDU session. To resolve the foregoing problem, an embodiment of the present invention provides solutions in FIG. 2 to FIG. 4.

FIG. 2 is a schematic flowchart of a session migration method according to an embodiment of the present invention. In this embodiment of the present invention, the method includes the following steps:

S201: A terminal apparatus determines that user plane security enforcement information of a PDU session matches user plane security protection information of an EPS.

Specifically, before this step, the terminal apparatus has registered with the 5GS, and the PDU session has been established in the 5GS. When the terminal apparatus moves from the 5GS to the EPS, the terminal apparatus needs to migrate the PDU session previously established in the 5GS to the EPS. For example, when the terminal apparatus moves from an NR-RAN in the 5GS to an E-UTRAN in the EPS, the terminal apparatus determines that the PDU session established in the 5GS needs to be migrated to the EPS. Before the PDU session is migrated to the EPS, the terminal apparatus determines whether the user plane security enforcement information of the PDU session matches the user plane security protection information of the EPS.

A method for the terminal apparatus to obtain user plane encryption protection information of the EPS may be as follows: The terminal apparatus obtains, by using a protocol configuration option (PCO) of a PGW-C in the EPS, the user plane encryption protection information that is of the EPS and that is carried in the PCO.

Because the terminal apparatus cannot detect the user plane security enforcement information of the PDU session, the terminal apparatus cannot obtain a user plane security status of the PDU session by directly parsing the user plane security enforcement information. In this embodiment, a method for the terminal apparatus to obtain the user plane security status of the PDU session may be as follows: The terminal apparatus obtains the user plane security status of the PDU session by detecting a packet transmitted in the PDU session. For example, if the terminal apparatus can directly parse (decrypt without using a key) content of the packet, it indicates that the packet is not encrypted, that is, the PDU session is not encrypted, or if the terminal device needs to use a key to decrypt content of the packet, it indicates that the packet is encrypted, that is, the PDU session is encrypted. If the terminal apparatus detects the packet carries a verification code used for integrity protection, it indicates that the packet is integrity protected, that is, the PDU session is integrity protected; otherwise, it indicates that the packet is not integrity protected, that is, the PDU session is not integrity protected.

The terminal apparatus determines whether the user plane security status of the PDU session matches the user plane encryption protection information of the EPS, actually for a purpose of determining whether a user plane security capability of the EPS can satisfy a user plane security requirement of the PDU session. If the user plane security status of the PDU session matches the user plane encryption protection information of the EPS, it indicates that the user plane security capability of the EPS satisfies the user plane security requirement of the PDU session; or if the user plane security status of the PDU session does not match the user plane encryption protection information of the EPS, it indicates that the user plane security capability of the EPS does not satisfy the user plane security requirement of the PDU session.

In a possible implementation, the user plane security status of the PDU session includes an integrity protection status and an encryption status, and the user plane encryption protection information of the EPS includes user plane encryption activation information.

When the user plane security status of the PDU session is that the PDU session is not integrity protected, and the user plane encryption protection information of the EPS indicates that the EPS has activated user plane encryption, the user plane security status of the PDU session matches the user plane encryption protection information of the EPS.

For example, the integrity protection status includes two states: The PDU session is integrity protected, and the PDU session is not integrity protected. The encryption protection status includes two states: The PDU session is encrypted, and the PDU session is not encrypted. The user plane encryption activation information includes two forms: activated and unactivated. When the terminal apparatus parses the packet transmitted in the PDU session, and determines that the integrity protection status is that the PDU session is not integrity protected and the encryption status is that the PDU session is not encrypted, the terminal apparatus does not need to parse the user plane encryption protection information again. In other words, regardless the user plane encryption activation information is activated or unactivated, the terminal apparatus can directly determine that the user plane security status of the PDU session matches the user plane encryption protection information of the EPS.

In another possible implementation, when the integrity protection status is that the PDU session is not integrity protected, the encryption status is that the PDU session is encrypted, and the user plane encryption activation information indicates that the EPS has activated user plane encryption, the user plane security status of the PDU session matches the user plane encryption protection information of the EPS.

For example, the integrity protection status includes two states: The PDU session is integrity protected, and the PDU session is not integrity protected. The encryption protection status includes two states: The PDU session is encrypted, and the PDU session is not encrypted. The user plane encryption activation information includes two forms: activated and unactivated. When the terminal apparatus parses the packet transmitted in the PDU session, determines that the integrity protection status is that the PDU session is not integrity protected and the encryption status is that the PDU session is encrypted, and the user plane encryption activation information is activated, the terminal apparatus determines that the user plane security status of the PDU session matches the user plane encryption protection information of the EPS.

In another possible implementation, the user plane security status of the PDU session includes an integrity protection status.

When the integrity protection status is that the PDU session is integrity protected, the user plane security status of the PDU session does not match the user plane encryption protection information of the EPS.

For example, the integrity protection status includes two states: The PDU session is integrity protected, and the PDU session is not integrity protected. The encryption protection status includes two states: The PDU session is encrypted, and the PDU session is not encrypted. The user plane encryption activation information includes two forms: activated and unactivated. Because a user plane of the EPS does not support integrity protection, when the integrity protection status is that the PDU session is integrity protected, the terminal apparatus does not need to parse the encryption protection status and the user plane encryption activation information again. In other words, the terminal apparatus can directly determine that the user plane security status of the PDU session does not match the user plane encryption protection information of the EPS.

S202: The terminal apparatus sends PDN connection establishment request information to a mobility management apparatus, and the mobility management apparatus receives the PDN connection establishment request information from the terminal apparatus.

Specifically, when the user plane security status of the PDU session matches the user plane encryption protection information of the EPS, the terminal apparatus sends a PDN connection request to the mobility management apparatus, where the mobility management apparatus may be an MME in the EPS. The PDN connection establishment request information is used to establish a PDN connection corresponding to the PDU session in the EPS, where the PDN connection corresponding to the PDU session indicates that the PDU session is established in the 5GS. When the terminal apparatus moves from the 5GS to the EPS, the terminal apparatus establishes the PDN connection corresponding to the PDU session in the EPS, and when the PDN connection is successfully established in the EPS, the terminal apparatus releases the PDU session.

In this embodiment, a determining condition for the terminal apparatus to send the PDN connection establishment request information to the mobility management apparatus is not limited to only the determining condition in S201, and may further include one or more other determining conditions. For example, another determining condition is that a data network name (DNN) of the PDU session is a local area data network (LADN). To be specific, the terminal apparatus sends the PDN connection establishment request information to the mobility management apparatus only when both the following conditions are satisfied: The user plane security status of the PDU session matches the user plane security protection information of the EPS and the DNN of the PDU session is the LADN.

In a possible implementation, when the user plane security status of the PDU session does not match the user plane encryption protection information of the EPS, the terminal apparatus determines not to send a PDN connection establishment request to the mobility management apparatus. In other words, the terminal apparatus does not establish a PDN connection corresponding to the PDU session in the EPS. To be specific, only when the user plane security status of the PDU session matches the user plane encryption protection information of the EPS, the terminal apparatus sends the PDN connection establishment request to the mobility management apparatus. This avoids that a PDU session that has a requirement beyond a user plane security capability of the EPS to the EPS, and reduces an unnecessary signaling resource waste.

Figure 3:
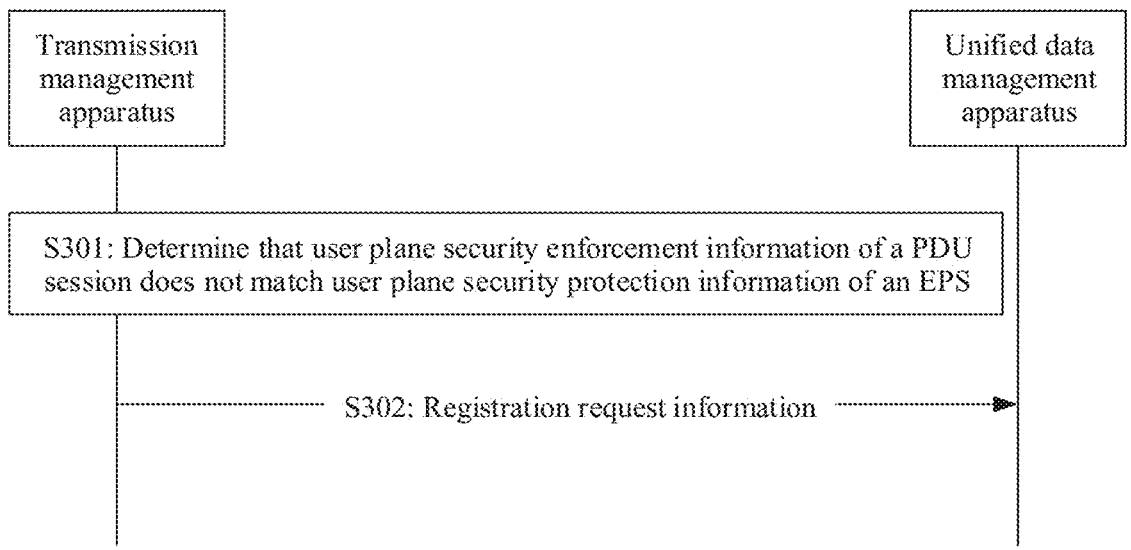
FIG. 3 is another schematic flowchart of session migration according to an embodiment of the present invention.

FIG. 3 is a schematic flowchart of a session migration method according to an embodiment of the present invention. In this embodiment of the present invention, the method includes the following steps:

S301: A transmission management apparatus determines that user plane security enforcement information of a PDU session does not match user plane security protection information of an EPS.

Specifically, the transmission management apparatus may include two apparatuses: an SMF and a PGW-C, or may be an apparatus that has both an SMF function and a PGW-C function. A subscriber information management apparatus may include two apparatuses: a UDM and an HSS, or may be an apparatus that has a UDM function and an HSS function. Before this step, the terminal apparatus has established the PDU session in a 5GS, and the PDU session has been registered with the subscriber information management apparatus. A method for the transmission management apparatus to obtain the user plane security enforcement information of the PDU session may be as follows: The transmission management apparatus obtains a dynamic user plane security policy of the PDU session from a PCF, where the user plane security policy includes the user plane security enforcement information of the PDU session.

A method for the transmission management apparatus to obtain user plane encryption protection information of the EPS may be as follows: The transmission management apparatus prestores or preconfigures the user plane encryption protection information of the EPS; or the transmission management apparatus obtains the user plane encryption protection information of the EPS from a PCRF in the EPS.

The transmission management apparatus determines whether the user plane security enforcement information of the PDU session matches the user plane encryption protection information of the EPS, actually for a purpose of determining whether a user plane security capability of the EPS can satisfy a user plane security requirement of the PDU session. If the user plane security enforcement information of the PDU session matches the user plane encryption protection information of the EPS, it indicates that the user plane security capability of the EPS satisfies the user plane security requirement of the PDU session; or if the user plane security enforcement information of the PDU session does not match the user plane encryption protection information of the EPS, it indicates that the user plane security capability of the EPS does not satisfy the user plane security requirement of the PDU session.

In a possible implementation, the user plane security enforcement information of the PDU session includes integrity protection requirement information and encryption requirement information, and the user plane encryption protection information of the EPS includes user plane encryption activation information.

When the user plane security requirement information of the PDU session indicates that the PDU session is not integrity protected, and the user plane encryption protection information of the EPS indicates that the EPS has activated user plane encryption, the user plane security enforcement information of the PDU session matches the user plane encryption protection information of the EPS.

For example, the integrity protection requirement information includes three forms: required, preferred, and not needed. The form required indicates that the PDU session needs to be integrity protected, the form preferred indicates that the PDU session is preferentially integrity protected, and the form not needed indicates that the PDU session does not need to be integrity protected. The integrity protection requirement information may be indicated by using a bit, and different bit values correspond to different integrity protection requirement information. The encryption protection requirement information includes three forms: required, preferred, and not needed. The form required indicates that the PDU session needs to be encrypted, the form preferred indicates that the PDU session is preferentially encrypted, and the form not needed indicates that the PDU session does not need to be encrypted. The encryption requirement information may be indicated by using a bit, and different bit values are used to indicate different encryption requirement information. The user plane encryption activation information includes two forms: activated and unactivated. When the transmission management apparatus determines that the integrity protection requirement information is not needed, and the encryption requirement information is not needed, the transmission management apparatus does not need to parse the user plane encryption protection information. In other words, regardless the user plane encryption activation information is activated or unactivated, the transmission management apparatus can directly determine that the user plane security enforcement information of the PDU session matches the user plane encryption protection information of the EPS.

In another possible implementation, when the integrity protection requirement information indicates that the PDU session is not integrity protected, the encryption requirement information indicates that the PDU session is encrypted, and the user plane encryption activation information indicates that the EPS has activated user plane encryption, the user plane security enforcement information of the PDU session matches the user plane encryption protection information of the EPS.

For example, the integrity protection requirement information includes three forms: required, preferred, and not needed. The form required indicates that the PDU session needs to be integrity protected, the form preferred indicates that the PDU session is preferentially integrity protected, and the form not needed indicates that the PDU session does not need to be integrity protected. The integrity protection requirement information may be indicated by using a bit, and different bit values correspond to different integrity protection requirement information. The encryption protection requirement information includes three forms: required, preferred, and not needed. The form required indicates that the PDU session needs to be encrypted, the form preferred indicates that the PDU session is preferentially encrypted, and the form not needed indicates that the PDU session does not need to be encrypted. The encryption requirement information may be indicated by using a bit, and different bit values are used to indicate different encryption requirement information. The user plane encryption activation information includes two forms: activated and unactivated. When the transmission management apparatus determines that the integrity protection requirement information is not needed, the encryption requirement information is required, and the user plane encryption activation information is 'activated, the transmission management apparatus determines that the user plane security enforcement information of the PDU session matches the user plane encryption protection information of the EPS.

In another possible implementation, the user plane security enforcement information of the PDU session includes integrity protection requirement information.

When the integrity requirement information indicates that the PDU session is integrity protected, the user plane security enforcement information of the PDU session does not match the user plane encryption protection information of the EPS.

For example, the integrity protection requirement information includes three forms: required, preferred, and not needed. The form required indicates that the PDU session needs to be integrity protected, the form preferred indicates that the PDU session is preferentially integrity protected, and the form not needed indicates that the PDU session does not need to be integrity protected. The integrity protection requirement information may be indicated by using a bit, and different bit values correspond to different integrity protection requirement information. The encryption protection requirement information includes three forms, required, preferred, and not needed. The form required indicates that the PDU session needs to be encrypted, the form preferred indicates that the PDU session is preferentially encrypted, and the form not needed indicates that the PDU session does not need to be encrypted. The encryption requirement information may be indicated by using a bit, and different bit values are used to indicate different encryption requirement information. The user plane encryption activation information includes two forms: activated and unactivated. Because a user plane of the EPS does not support integrity protection, when the integrity protection requirement information is required, the transmission management apparatus does not need to parse the encryption protection requirement information and the user plane encryption activation information again. In other words, the terminal apparatus can directly determine that the user plane security enforcement information of the PDU session does not match the user plane encryption protection information of the EPS.

S302: The transmission management apparatus sends registration request cancellation information to the subscriber information management apparatus, and the subscriber information management apparatus receives the registration request cancellation information from the transmission management apparatus.

Specifically, when the user plane security enforcement information of the PDU session does not match the user plane encryption protection information of the EPS, the transmission management apparatus sends a registration request cancellation to the subscriber information management apparatus, where the registration request cancellation is used to notify the subscriber information management apparatus that the PDU session does not support migration to the EPS. The subscriber information management apparatus may include two apparatuses: a UDM and an HSS, or may be an apparatus that has both a UDM function and an HSS function.

In a possible implementation, before the registration request cancellation information is sent, the PDU session has been registered with the subscriber information management apparatus, and the registration request cancellation information may be used to indicate the subscriber information management apparatus to mark the PDU session as not supporting the migration to the EPS. For example, a unified data management network element stores a PDU session identifier of the PDU session and EPS migration indication information corresponding to the PDU session identifier. The EPS migration indication information is indicated by using a bit. When a value of the EPS migration indication information is "1", it indicates that the PDU session supports the migration to the EPS, or when a value of the EPS migration indication information is "0", it indicates that the PDU session does not support the migration to the EPS. A PDU session registered with the unified data management network element for the first time supports the migration to the EPS by default. To be specific, during the first registration, a value of EPS migration indication information of the PDU session is "1". When the subscriber information management apparatus receives the registration request cancellation that carries a PDU session identifier and that is sent by the transmission management apparatus, the subscriber information management apparatus sets the value of the EPS migration indication information corresponding to the PDU session identifier to "0".

In another possible implementation, before the registration request cancellation, the PDU session has been registered with the subscriber information management apparatus, and the PDU session registered with the subscriber information management apparatus supports the migration to the EPS by default. In this case, the subscriber information management apparatus receives the registration request cancellation that carries a PDU session identifier and that is sent by the transmission management apparatus, and the subscriber information management apparatus deletes a PDU session indicated by the PDU session identifier.

When the user plane security enforcement information of the PDU session matches the user plane encryption protection information of the EPS, the transmission management apparatus determines not to send the registration request cancellation to the subscriber information management apparatus, that is, the PDU session supports the migration to the EPS.

Figure 4:
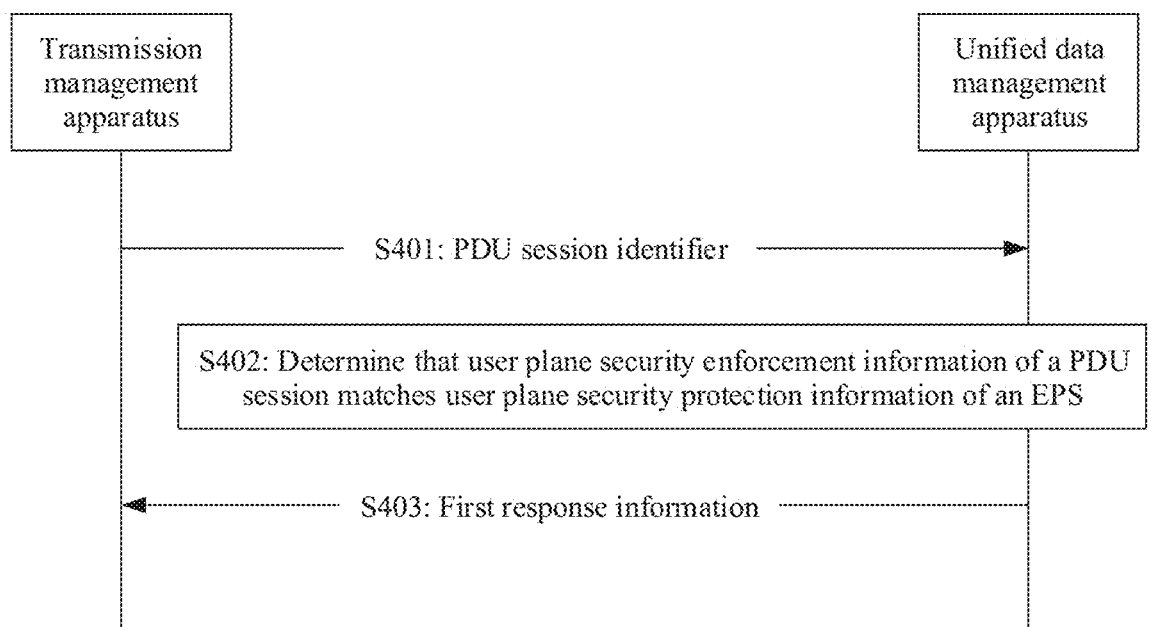
FIG. 4 is still another schematic flowchart of a session migration method according to an embodiment of the present invention.

FIG. 4 is a schematic flowchart of a session migration method according to an embodiment of the present invention. In this embodiment of the present invention, the method includes the following steps:

S401: A transmission management apparatus sends a PDU session identifier to a subscriber information management apparatus, and the subscriber information management apparatus receives the PDU session identifier from the transmission management apparatus.

Specifically, the PDU session identifier may be carried in a registration request. The transmission management apparatus is configured to manage a PDU session and a PDN connection. The transmission management apparatus may include two apparatuses: an SMF and a PGW-C, or may be an apparatus that has both an SMF function and a PGW-C function. The subscriber information management apparatus may include two apparatuses: a UDM and an HSS, or may be an apparatus that has both a UDM function and an HSS function. In a possible implementation, the registration request may further carry an identifier of a DNN serving the PDU session and an identifier of the transmission management apparatus, for example, an identifier of the SMF.

S402: The subscriber information management apparatus determines that user plane security enforcement information of the PDU session matches user plane security protection information of an EPS.

Specifically, a method for the subscriber information management apparatus to obtain user plane encryption protection information of the EPS may be as follows: The subscriber information management apparatus prestores or preconfigures the user plane encryption protection information of the EPS; or the subscriber information management apparatus obtains the user plane encryption protection information of the EPS from a PCRF in the EPS.

A method for the subscriber information management apparatus to obtain the user plane security enforcement information of the PDU session may be as follows: The subscriber information management apparatus receives the PDU session identifier and the user plane security enforcement information or a user plane security enforcement policy associated with the PDU session identifier that are from the transmission management apparatus. The subscriber information management apparatus maintains a correspondence between the PDU session identifier and user plane security enforcement information, or a correspondence between the PDU session identifier and the user plane security policy. The user plane security enforcement information associated with the PDU session identifier indicates that a network element apparatus (for example, the subscriber information management apparatus) stores a PDU session identifier and user plane security enforcement information, and there is a mapping relationship between the PDU session identifier and the user plane security enforcement information.

The subscriber information management apparatus determines whether the user plane security enforcement information of the PDU session matches the user plane encryption protection information of the EPS, actually for a purpose of determining whether a user plane security capability of the EPS can satisfy a user plane security requirement of the PDU session. If the user plane security enforcement information of the PDU session matches the user plane encryption protection information of the EPS, it indicates that the user plane security capability of the EPS satisfies the user plane security requirement of the PDU session; or if the user plane security enforcement information of the PDU session does not match the user plane encryption protection information of the EPS, it indicates that the user plane security capability of the EPS does not satisfy the user plane security requirement of the PDU session.

In a possible implementation, the user plane security enforcement information of the PDU session includes integrity protection requirement information and encryption requirement information, and the user plane encryption protection information of the EPS includes user plane encryption activation information.

When the user plane security requirement information of the PDU session indicates that the PDU session is not integrity protected, and the user plane encryption protection information of the EPS indicates that the EPS has activated user plane encryption, the user plane security enforcement information of the PDU session matches the user plane encryption protection information of the EPS.

For example, the integrity protection requirement information includes three forms: required, preferred, and not needed. The form required indicates that the PDU session needs to be integrity protected, the form preferred indicates that the PDU session is preferentially integrity protected, and the form not needed indicates that the PDU session does not need to be integrity protected. The integrity protection requirement information may be indicated by using a bit, and different bit values correspond to different integrity protection requirement information. The encryption protection requirement information includes three forms: required, preferred, and not needed. The form required indicates that the PDU session needs to be encrypted, the form preferred indicates that the PDU session is preferentially encrypted, and the form not needed indicates that the PDU session does not need to be encrypted. The encryption requirement information may be indicated by using a bit, and different bit values are used to indicate different encryption requirement information. The user plane encryption activation information includes two forms: activated and unactivated. When the transmission management apparatus determines that the integrity protection requirement information is not needed, and the encryption requirement information is not needed, the transmission management apparatus does not need to parse the user plane encryption protection information. In other words, regardless the user plane encryption activation information is activated or unactivated, the transmission management apparatus can directly determine that the user plane security enforcement information of the PDU session matches the user plane encryption protection information of the EPS.

In another possible implementation, when the integrity protection requirement information indicates that the PDU session is not integrity protected, the encryption requirement information indicates that the PDU session is encrypted, and the user plane encryption activation information indicates that the EPS has activated user plane encryption, the user plane security enforcement information of the PDU session matches the user plane encryption protection information of the EPS.

For example, the integrity protection requirement information includes three forms: required, preferred, and not needed. The form required indicates that the PDU session needs to be integrity protected, the form preferred indicates that the PDU session is preferentially integrity protected, and the form not needed indicates that the PDU session does not need to be integrity protected. The integrity protection requirement information may be indicated by using a bit, and different bit values correspond to different integrity protection requirement information. The encryption protection requirement information includes three forms: required, preferred, and not needed. The form required indicates that the PDU session needs to be encrypted, the form preferred indicates that the PDU session is preferentially encrypted, and the form not needed indicates that the PDU session does not need to be encrypted. The encryption requirement information may be indicated by using a bit, and different bit values are used to indicate different encryption requirement information. The user plane encryption activation information includes two forms: activated and unactivated. When the transmission management apparatus determines that the integrity protection requirement information is not needed, the encryption requirement information is required, and the user plane encryption activation information is 'activated, the transmission management apparatus determines that the user plane security enforcement information of the PDU session matches the user plane encryption protection information of the EPS.

In another possible implementation, the user plane security enforcement information of the PDU session includes integrity protection requirement information.

When the integrity requirement information indicates that the PDU session is integrity protected, the user plane security enforcement information of the PDU session does not match the user plane encryption protection information of the EPS.

For example, the integrity protection requirement information includes three forms: required, preferred, and not needed. The form required indicates that the PDU session needs to be integrity protected, the form preferred indicates that the PDU session is preferentially integrity protected, and the form not needed indicates that the PDU session does not need to be integrity protected. The integrity protection requirement information may be indicated by using a bit, and different bit values correspond to different integrity protection requirement information. The encryption protection requirement information includes three forms: required, preferred, and not needed. The form required indicates that the PDU session needs to be encrypted, the form preferred indicates that the PDU session is preferentially encrypted, and the form not needed indicates that the PDU session does not need to be encrypted. The encryption requirement information may be indicated by using a bit, and different bit values are used to indicate different encryption requirement information. The user plane encryption activation information includes two forms: activated and unactivated. Because a user plane of the EPS does not support integrity protection, when the integrity protection requirement information is required, the transmission management apparatus does not need to parse the encryption protection requirement information and the user plane encryption activation information again. In other words, the terminal apparatus can directly determine that the user plane security enforcement information of the PDU session does not match the user plane encryption protection information of the EPS.

In a possible implementation, when the user plane security enforcement information of the PDU session matches the user plane encryption protection information of the EPS, the subscriber information management apparatus registers the PDU session, and sets a value of EPS migration indication information of the PDU session to a first preset value, where the first preset value indicates that the PDU session supports migration to the EPS. For example, if the value of the EPS migration indication information is "1", it indicates that the PDU session supports the migration to the EPS.

In another possible implementation, when the user plane security enforcement information of the PDU session does not match the user plane encryption protection information of the EPS, the subscriber information management apparatus rejects registration of the PDU session, and sets a value of EPS migration indication information of the PDU session to a second preset value, where the second preset value indicates that the PDU session does not support migration to the EPS. For example, if the value of the EPS migration indication information is "0", it indicates that the PDU session does not support the migration to the EPS.

S403: The subscriber information management apparatus sends a first response message to the transmission management apparatus.

Specifically, when the user plane security enforcement information of the PDU session matches the user plane encryption protection information of the EPS, the subscriber information management apparatus sends the first response information to the transmission management apparatus, where the first response information indicates that the PDU session supports the migration to the EPS. The first response information may carry the PDU session identifier, the EPS migration indication information, and a DNN identifier. The EPS migration indication information indicates that the PDU session supports the migration to the EPS. For example, the EPS migration indication information is EPS enable. The DNN identifier indicates an identity of a DNN serving the PDU session.

In a possible implementation, when the user plane security enforcement information of the PDU session does not match the user plane encryption protection information of the EPS, the subscriber information management apparatus sends second response information to the transmission management apparatus, where the second response information indicates that the PDU session does not support the migration to the EPS. The second response information may carry the PDU session identifier, the EPS migration indication information, and the DNN identifier. The EPS migration indication information indicates that the PDU session does not support the migration to the EPS. For example, the EPS migration indication information is EPS disable. The DNN identifier indicates an identity of a DNN serving the PDU session.

The foregoing describes in detail the method according to the embodiments of the present invention, and the following provides an apparatus according to an embodiment of the present invention.

Figure 5:
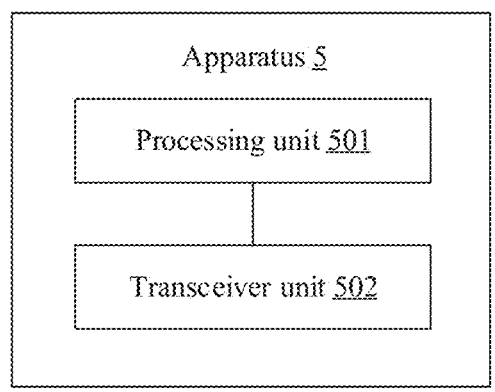
FIG. 5 is a schematic structural diagram of an apparatus according to an embodiment of the present invention.

FIG. 5 is a schematic structural diagram of an apparatus according to an embodiment of the present invention. The apparatus 5 may include a processing unit 501 and a transceiver unit 502.

Embodiment 1: The processing unit 501 is configured to: in a process in which the apparatus 5 moves from a 5GS to an EPS, determine whether a user plane security status of a PDU session matches user plane encryption protection information of the EPS. For example, the processing unit 501 may perform S201 in FIG. 2.

The transceiver unit 502 is configured to: when a determining result of the processing unit 501 is yes, send PDN connection establishment request information to a mobility management apparatus, where the PDN connection establishment request information is used to establish a PDN connection corresponding to the PDU session in the EPS, and the PDU session is established by the apparatus 5 in the 5GS. For example, the transceiver unit is configured to perform S202 in FIG. 2.

In a possible implementation, the user plane security status of the PDU session includes an integrity protection status and an encryption status, and the user plane encryption protection information of the EPS includes user plane encryption activation information.

When the integrity protection status is that the PDU session is not integrity protected, and the encryption status is that the PDU session is not encrypted, the user plane security status of the PDU session matches the user plane encryption protection information of the EPS; or when the integrity protection status is that the PDU session is not integrity protected, the encryption status is that the PDU session is encrypted, and the user plane encryption activation information indicates that the EPS has activated user plane encryption, the user plane security status of the PDU session matches the user plane encryption protection information of the EPS.

In a possible implementation, the user plane security status of the PDU session includes an integrity protection status.

When the integrity protection status is that the PDU session is integrity protected, the user plane security status of the PDU session does not match the user plane encryption protection information of the EPS.

In a possible implementation, the processing unit 501 is further configured to:

when the user plane security status of the PDU session does not match the user plane encryption protection information of the EPS, determine not to send a PDN connection establishment request to the mobility management apparatus.

The apparatus 5 may be a terminal apparatus, or the apparatus 5 may be a field programmable gate array (FPGA), an application-specific integrated chip, a system on chip (SoC), a central processing unit (CPU), a network processor (NP), a digital signal processing circuit, or a micro controller unit (MCU) that implements a related function, or may be a programmable controller (PLD) or another integrated chip.

This embodiment of the present invention and the method embodiment of FIG. 2 are based on a same concept, and technical effects brought by the embodiments are also the same. For a specific process, refer to the description in the method embodiment of FIG. 2. Details are not described herein again.

Embodiment 2: The processing unit 501 is configured to determine whether user plane security enforcement information of a PDU session matches user plane encryption protection information of an EPS. For example, the processing unit 501 performs S301 in FIG. 3.

The transceiver unit 502 is configured to: when a determining result of the processing unit 501 is yes, send registration request cancellation information to a subscriber information management apparatus, where the registration request cancellation information is used to indicate that the PDU session does not support migration to the EPS, and the PDU session has been registered with the subscriber information management apparatus. For example, the transceiver unit 502 performs S302 in FIG. 3.

In a possible implementation, the user plane security enforcement information of the PDU session includes integrity protection requirement information.

When the integrity protection requirement information indicates that the PDU session is integrity protected, the user plane security enforcement information of the PDU session does not match the user plane encryption protection information of the EPS.

In a possible implementation, the user plane security enforcement information of the PDU session includes integrity protection requirement information and encryption requirement information, and the user plane encryption protection information of the EPS includes user plane encryption activation information.

When the integrity protection requirement information indicates that the PDU session is not integrity protected, and the encryption requirement information indicates that the PDU session is not encrypted, the user plane security enforcement information of the PDU session matches the user plane encryption protection information of the EPS; or when the integrity protection requirement information indicates that the PDU session is not integrity protected, the encryption requirement information indicates that the PDU session is encrypted, and the user plane encryption capability information indicates that the EPS has activated user plane encryption, the user plane security enforcement information of the PDU session matches the user plane encryption protection information of the EPS.

In a possible implementation, the processing unit 501 is further configured to:

when the user plane security enforcement information of the PDU session matches the user plane encryption protection information of the EPS, determine not to send a registration request cancellation to the subscriber information management apparatus.

In a possible implementation, the registration request cancellation information is used to delete the PDU session or set EPS migration indication information that is of the PDU session and that is stored in the subscriber information management apparatus to a preset value, and the preset value indicates that the migration to the EPS is not supported.

The apparatus 5 may be a transmission management apparatus. For example, the transmission management apparatus may include two apparatuses: an SMF and a PGW-C, or may be an apparatus that has both an SMF function and a PGW-C function. Alternatively, the apparatus 5 may be a field programmable gate array (FPGA), an application-specific integrated chip, a system on chip (SoC), a central processing unit (CPU), a network processor (NP), a digital signal processing circuit, or a micro controller unit (MCU) that implements a related function, or may be a programmable controller (PLD) or another integrated chip.

This embodiment of the present invention and the method embodiment of FIG. 3 are based on a same concept, and technical effects brought by the embodiments are also the same. For a specific process, refer to the description in the method embodiment of FIG. 3. Details are not described herein again.

Embodiment 3: The transceiver unit 502 is configured to receive a PDU session identifier from a transmission management apparatus. For example, the transceiver unit 502 performs S401 in FIG. 4.

The processing unit 501 is configured to determine whether user plane security enforcement information associated with the PDU session identifier matches user plane encryption protection information of an EPS. For example, the processing unit 501 performs S502 in FIG. 4.

The transceiver unit 502 is further configured to: when a determining result of the processing unit is yes, send first response information to the transmission management apparatus, where the first response information indicates that a PDU session indicated by the PDU session identifier supports migration to the EPS. For example, the transceiver unit 502 is configured to perform S503 in FIG. 4.

In a possible implementation, the user plane security enforcement information associated with the PDU session identifier includes integrity protection requirement information and encryption requirement information, and the user plane encryption protection information of the EPS includes user plane encryption activation information.

When the integrity protection requirement information indicates that the PDU session is not integrity protected, and the encryption requirement information indicates that the PDU session is not encrypted, the user plane security enforcement information associated with the PDU session identifier matches the user plane encryption protection information of the EPS; or when the integrity protection requirement information indicates that the PDU session is not integrity protected, the encryption requirement information indicates that the PDU session is encrypted, and the user plane encryption capability information indicates that the EPS has activated user plane encryption, the user plane security enforcement information associated with the PDU session identifier matches the user plane encryption protection information of the EPS.

In a possible implementation, the user plane security enforcement information associated with the PDU session identifier includes integrity protection requirement information.

When the integrity protection requirement information indicates that the PDU session is integrity protected, the user plane security enforcement information associated with the PDU session identifier does not match the user plane encryption protection information of the EPS.

In a possible implementation, the transceiver unit 502 is further configured to: when a determining result of the processing unit is no, send second response information to the transmission management apparatus, where the second response information indicates that the PDU session does not support the migration to the EPS.

In a possible implementation, the transceiver unit 502 is further configured to: receive the PDU session identifier and the user plane security enforcement information associated with the PDU session identifier that are from the transmission management apparatus.

The apparatus 5 may be a subscriber information management apparatus. For example, the subscriber information management apparatus may include two apparatuses: a UDM and an HSS, or may be an apparatus that has both a UDM function and an HSS function. Alternatively, the apparatus 5 may be a field programmable gate array (FPGA), an application-specific integrated chip, a system on chip (SoC), a central processing unit (CPU), a network processor (NP), a digital signal processing circuit, or a micro controller unit (MCU) that implements a related function, or may be a programmable controller (PLD) or another integrated chip.

This embodiment of the present invention and the method embodiment of FIG. 4 are based on a same concept, and technical effects brought by the embodiments are also the same. For a specific process, refer to the description in the method embodiment of FIG. 4. Details are not described herein again.

Figure 6:
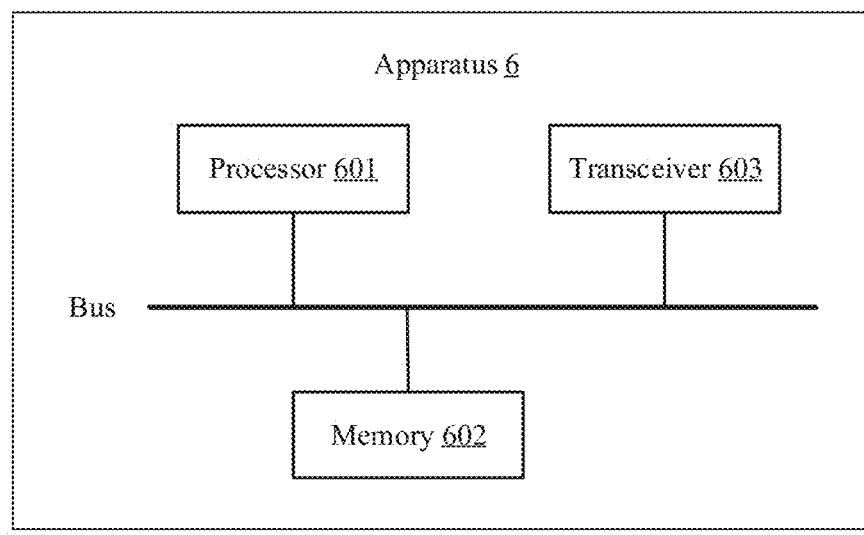
FIG. 6 is another schematic structural diagram of an apparatus according to an embodiment of the present invention.

FIG. 6 is a schematic structural diagram of an apparatus according to an embodiment of the present invention. The apparatus is referred to as an apparatus 6 below. The apparatus 6 may be integrated into the foregoing terminal apparatus, transmission management apparatus, or subscriber information management apparatus. As shown in FIG. 6, the apparatus includes a memory 602, a processor 601, and a transceiver 603.

The memory 602 may be an independent physical unit, and may be connected to the processor 601 and the transceiver 603 by using a bus. The memory 602, the processor 601, and the transceiver 603 may alternatively be integrated together, and implemented by hardware, or the like.

The memory 602 is configured to store a program for implementing the foregoing method embodiments or the modules in the apparatus embodiments. The processor 601 invokes the program to perform operations in the foregoing method embodiments.

Optionally, when some or all of the session migration methods in the foregoing embodiments are implemented by software, the apparatus 6 may alternatively include only a processor. The memory configured to store the program is located outside the apparatus 6. The processor 601 is connected to the memory through a circuit/wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory may include a volatile memory, for example, a random access memory (RAM). The memory may also include a non-volatile memory, for example, a flash memory, a hard disk drive (HDD), or a solid-state drive (SSD). The memory may further include a combination of the foregoing types of memories.

In the foregoing embodiments, a sending module or a transmitter performs a step of sending in the foregoing method embodiments, a receiving module or a receiver performs a step of receiving in the foregoing method embodiments, and another step is performed by another module or a processor. The sending module and the receiving module may form a transceiver module, and the receiver and the transmitter may form a transceiver.

An embodiment of this application further provides a computer storage medium storing a computer program, and the computer program is used to perform the session migration method provided in the foregoing embodiments.

An embodiment of this application further provides a computer program product including an instruction, and when the computer program product runs on a computer, the computer is enabled to perform the session migration method provided in the foregoing embodiments.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

What is claimed is:

1. A session migration method, comprising:
   sending, by a transmission management apparatus, registration request cancellation information to a subscriber information management apparatus in response to user plane security enforcement information of a packet data unit (PDU) session failing to match user plane encryption protection information of an evolved packet system (EPS),
   wherein the registration request cancellation information indicates that the PDU session fails to support migration to the EPS, and the PDU session has been registered with the subscriber information management apparatus.

2. The method according to claim 1, wherein the user plane security enforcement information of the PDU session comprises integrity protection requirement information, wherein
   the user plane security enforcement information of the PDU session fails to match the user plane encryption protection information of the EPS in response to the integrity protection requirement information indicating that the PDU session is integrity protected.

3. The method according to claim 1, wherein
   the user plane security enforcement information of the PDU session comprises integrity protection requirement information and encryption requirement information, and
   the user plane encryption protection information of the EPS comprises user plane encryption activation information, wherein
   the user plane security enforcement information of the PDU session matches the user plane encryption protection information of the EPS in response to the integrity protection requirement information indicating that the PDU session fails to be integrity protected and the encryption requirement information indicating that the PDU session fails to be encrypted; or
   the user plane security enforcement information of the PDU session matches the user plane encryption protection information of the EPS in response to the integrity protection requirement information indicating that the PDU session fails to be integrity protected, the encryption requirement information indicating that the PDU session is encrypted and a user plane encryption capability information indicating that the EPS has activated user plane encryption.

4. The method according to claim 1, further comprising:
   determining, by the transmission management apparatus, to fail to send a registration request cancellation to the subscriber information management apparatus in response to the user plane security enforcement information of the PDU session matching the user plane encryption protection information of the EPS.

5. The method according to claim 1, wherein
   the registration request cancellation information is useable to delete the PDU session or to set EPS migration indication information that is part of the PDU session and is stored in the subscriber information management apparatus as a preset value, and the preset value indicating that the migration to the EPS fails to be supported.

6. A transmission management apparatus, comprising:
   a processor, and
   a non-transitory computer readable memory coupled to the processor, wherein the non-transitory computer readable memory comprises instructions, the instructions executed by the processor cause the transmission management apparatus to perform:
   sending, by the transmission management apparatus, registration request cancellation information to a subscriber information management apparatus in response to user plane security enforcement information of a packet data unit (PDU) session failing to match user plane encryption protection information of an evolved packet system (EPS),
   wherein the registration request cancellation information indicates that the PDU session fails to support migration to the EPS, and the PDU session has been registered with the subscriber information management apparatus.

7. The transmission management apparatus according to claim 6, wherein the user plane security enforcement information of the PDU session comprises integrity protection requirement information, wherein
   the user plane security enforcement information of the PDU session fails to match the user plane encryption protection information of the EPS in response to the integrity protection requirement information indicates that the PDU session is integrity protected.

8. The transmission management apparatus according to claim 6, wherein the user plane security enforcement information of the PDU session comprises integrity protection requirement information and encryption requirement information, and the user plane encryption protection information of the EPS comprises user plane encryption activation information, wherein
the user plane security enforcement information of the PDU session matches the user plane encryption protection information of the EPS in response to the integrity protection requirement information indicating that the PDU session fails to be integrity protected and the encryption requirement information indicating that the PDU session fails to be encrypted; or
the user plane security enforcement information of the PDU session matches the user plane encryption protection information of the EPS in response to the integrity protection requirement information indicating that the PDU session fails to be integrity protected, the encryption requirement information indicating that the PDU session is encrypted and a user plane encryption capability information indicating that the EPS has activated user plane encryption.

9. The transmission management apparatus according to claim 6, wherein the instructions executed by the processor further cause the transmission management apparatus to perform:
determining, to fail to send a registration request cancellation to the subscriber information management apparatus in response to the user plane security enforcement information of the PDU session matching the user plane encryption protection information of the EPS.

10. The transmission management apparatus according to claim 6, wherein
the registration request cancellation information is useable to delete the PDU session or to set EPS migration indication information that is part of the PDU session and is stored in the subscriber information management apparatus as a preset value, and the preset value indicating that the migration to the EPS fails to be supported.

11. The method according to claim 1, further comprising:
receiving, by the subscriber information management apparatus, the registration request cancellation information; and
deleting, by the subscriber information management apparatus, the PDU session.

12. The method according to claim 1, further comprising:
receiving by the subscriber information management apparatus, the registration request cancellation information; and
setting, by the subscriber information management apparatus, EPS migration indication information that is part of the PDU session and is stored in the subscriber information management apparatus as a preset value, wherein the preset value indicating that the migration to the EPS fails to be supported.

13. A system, comprising:
a transmission management apparatus configured to:
send registration request cancellation information to a subscriber information management apparatus in response to user plane security enforcement information of a packet data unit (PDU) session failing to match user plane encryption protection information of an evolved packet system (EPS),
wherein the registration request cancellation information indicates that the PDU session fails to support migration to the EPS, and the PDU session has been registered with the subscriber information management apparatus; and
the subscriber information management apparatus configured to:
receive the registration request cancellation information; and
delete the PDU session or set EPS migration indication information that is part of the PDU session and is stored in the subscriber information management apparatus as a preset value, wherein the preset value indicating that the migration to the EPS fails to be supported.

14. The system according to claim 13, wherein the user plane security enforcement information of the PDU session comprises integrity protection requirement information, wherein
the user plane security enforcement information of the PDU session fails to match the user plane encryption protection information of the EPS in response to the integrity protection requirement information indicating that the PDU session is integrity protected.

15. The system according to claim 13, wherein
the user plane security enforcement information of the PDU session comprises integrity protection requirement information and encryption requirement information, and
the user plane encryption protection information of the EPS comprises user plane encryption activation information, wherein
the user plane security enforcement information of the PDU session matches the user plane encryption protection information of the EPS in response to the integrity protection requirement information indicating that the PDU session fails to be integrity protected and the encryption requirement information indicating that the PDU session fails to be encrypted; or
the user plane security enforcement information of the PDU session matches the user plane encryption protection information of the EPS in response to the integrity protection requirement information indicating that the PDU session fails to be integrity protected, the encryption requirement information indicating that the PDU session is encrypted and a user plane encryption capability information indicating that the EPS has activated user plane encryption.

16. The system according to claim 13, wherein the transmission management apparatus is further configured to:
determine to fail to send a registration request cancellation to the subscriber information management apparatus in response to the user plane security enforcement information of the PDU session matching the user plane encryption protection information of the EPS.

17. The system according to claim 13, wherein
the registration request cancellation information is useable to delete the PDU session or to set EPS migration indication information that is part of the PDU session and is stored in the subscriber information management apparatus as a preset value, and the preset value indicating that the migration to the EPS fails to be supported.

* * * * *